Dec. 12, 1967 C. R. KECK ET AL 3,358,143
ADJUSTABLE MOUNTING FOR PLASTIC PHOSPHOR
SCINTILLATION DETECTORS
Filed Oct. 13, 1966 3 Sheets-Sheet 1

INVENTORS
CHARLES R. KECK
PAUL W. JORDAN
BY
Semmes & Semmes
ATTORNEYS

INVENTORS
CHARLES R. KECK
PAUL W. JORDAN
BY
Semmes & Semmes
ATTORNEYS

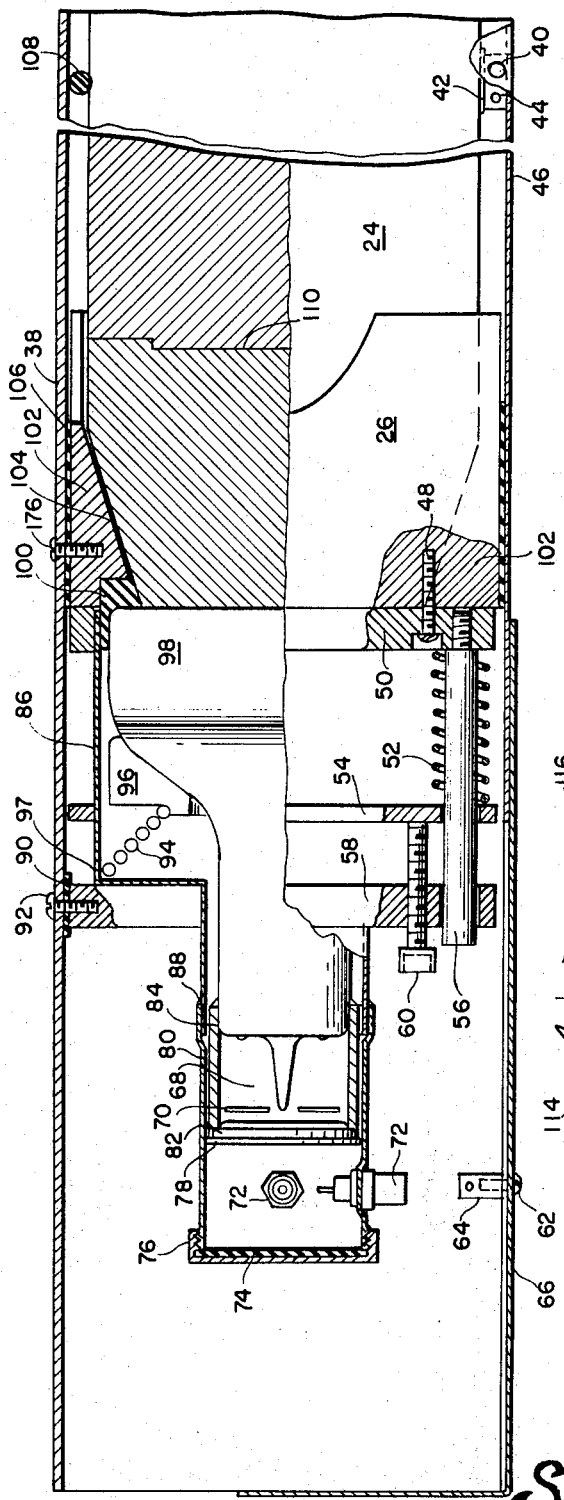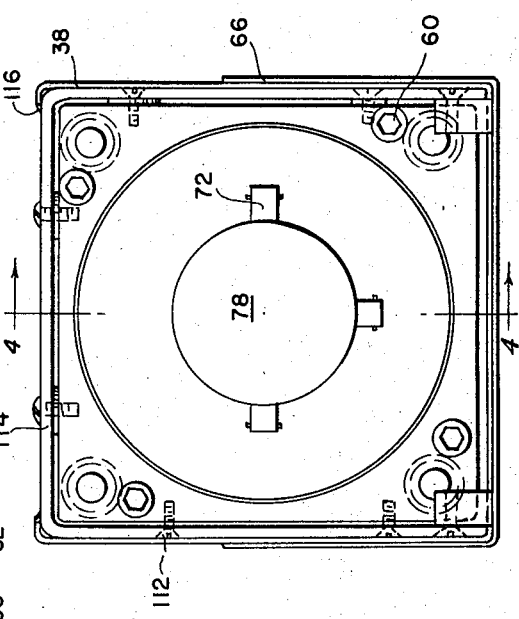

3,358,143
ADJUSTABLE MOUNTING FOR PLASTIC PHOSPHOR SCINTILLATION DETECTORS
Charles R. Keck, Morris Road, Okmulgee, Okla. 74447, and Paul W. Jordan, Montana State University, Bozeman, Mont. 59715
Filed Oct. 13, 1966, Ser. No. 586,509
2 Claims. (Cl. 250—71.5)

ABSTRACT OF THE DISCLOSURE

An adjustable mounting for plastic phosphor logs and photomultiplier tubes of the type used in radiant energy measuring devices.

---

The present application is a continuation-in-part of application Ser. No. 554,051, entitled Method of Measuring Lean Meat Characteristics of Domestic Animals, and filed May 31, 1966.

The present application relates to a scintillation detector, particularly an adjustable mounting for the plastic phosphor logs and photomultiplier tubes used in such detectors.

In the parent application, there was described the method for immobilizing an animal whose lean meat characteristics were to be determined by counting the potassium isotope $K_{40}$ emanating as low level gamma radiation from the lean tissue. The animal is positioned within a detection zone surrounded by plastic phosphor logs and adjoining photomuliplier tubes connected to said logs in electrical additive relationship. The present application is directed to the combination of plastic phoshor detector logs and a flat, circular detector as well as the means for supporting these detectors within a shielded detection zone. Particularly, the present application is directed to the individual housing for each plastic phosphor log, and the housing for a flat, circular moble detector mounted normally to the plastic phosphor logs and at one end of the detection zone.

Previous scintillation detectors have been of the liquid type wherein a liquid tank was used to define a detection zone and a plurality of radially extending photomultiplier tubes were supported outwardly of the tank. This results in unusual bulk of the unit, precluding its mobility, for example, in studying separated herds of cattle. Applicant, on the other hand, uses highly polished plastic phosphor logs to define a detection zone of horseshoe configuration and mounting photomuliplier tubes at each end of said log. As a result, there is provided a compact, highly efficient scintillation detection unit. Also, the flat, circular detector at one end of the zone mounted normally to the plastic logs provide further accuracy in the scintillation count.

Accordingly, it is an object of invention to provide a compact, yet highly efficient scintillation detector unit.

Another object of invention is to provide a scintillation detector unit wherein plastic phosphor logs are employed together with a flat circular detector to define a horseshoe-shaped detection zone.

Another object of invention is to provide an inert housing for the individual plastic logs which are readily removable for cleaning, service and replacement of detector elements.

Yet additional objects of the invention will become apparent from the ensuing specification and attached drawings, wherein.

FIG. 4 is a fragmentary vertical section taken along section line 4—4 of FIG. 5, showing the plastic phosphor log 24 and its truncated end section 26 resiliently mounted with respect to the photomultiplier tube 98 in stainless steel housing 38; the top half illustrating the mounting at the base end and the bottom half illustrating the resilient mounting plate at the adjusting end of the log.

FIG. 5 is an end elevation of plastic phosphor log and its stainless steel housing.

Figure 6:
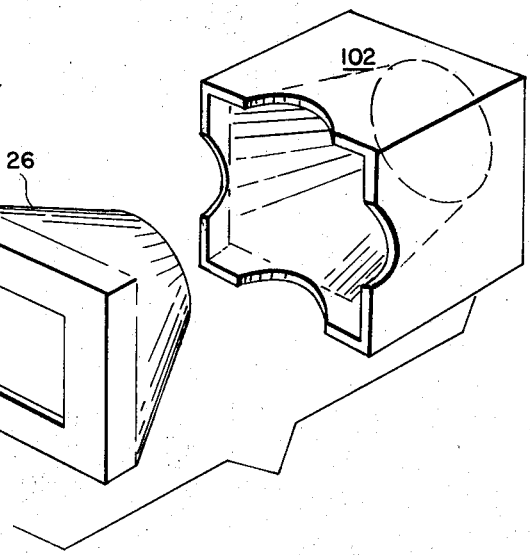

FIG. 6 is an exploded fragmentary view showing the positioning of the plastic phosphor truncated end section 26 in mounting block 102.

Figure 1:
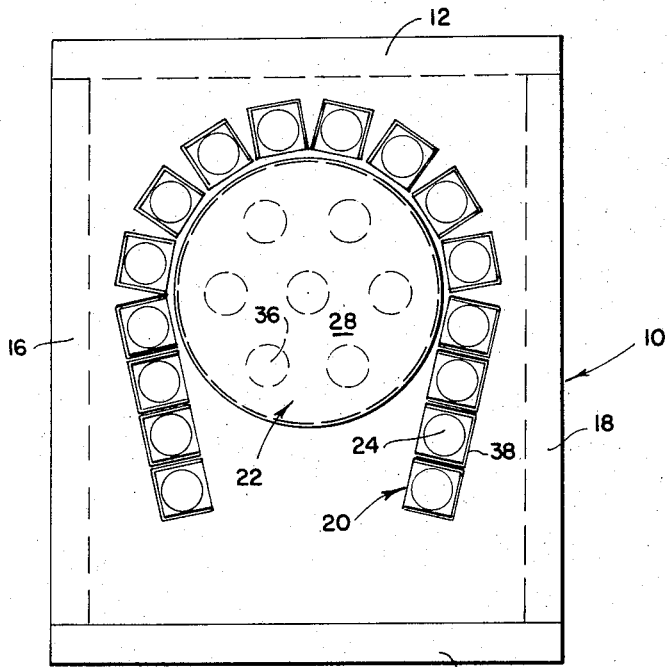
FIG. 1 is an end elevation of a shielded detection zone, showing the ends of the plastic phosphor logs in horseshoe configuration and the flat circular detector 28 mounted at the far end of the detection zone.
Figure 2:
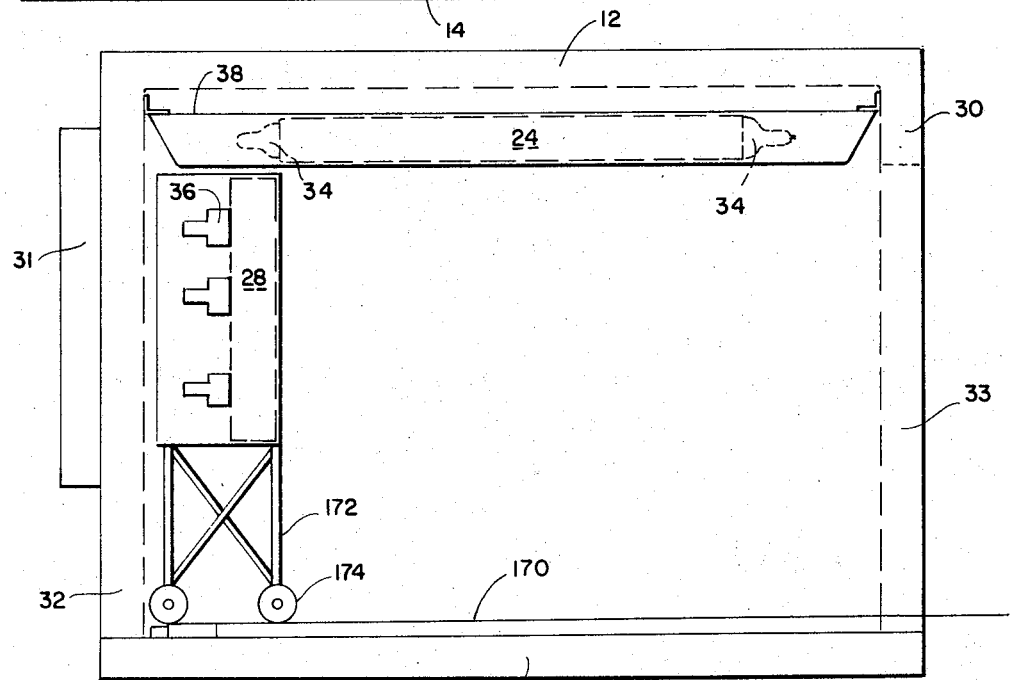
FIG. 2 is a side elevation, partially in phantom of the unit illustrated in FIG. 1, showing the flat circular detector mounted on wheels for mobility within the detection zone.

In FIG. 1 detection zone shield is illustrated as comprised of top 12, bottom 14, sides 16 and 18 and end pieces 30 and 32. At one end an entrance 33 is provided for delivery of the livestock or other subject matter being studied and at the other end an opening with cover 31 provides accessibility to the flat circular detector 28. A door (not illustrated) is provided for closing the entrance 33 as the animal is positioned for measuring within the detection zone.

The horseshoe-shaped bank of detectors 20 is comprised of individual highly polished plastic phosphor logs 24 mounted within removable stainless steel U-channels 38 and having photomultiplier tubes 34 mounted at their truncated ends 26 in electrical additive relationship. A flat circular plastic phosphor disc 28 is mounted normally to the horseshoe-shaped detection zone and at one end thereof upon carriage 172 having wheels 174 engaging horizontal tract 170 extending out of entrance 33. A plurality of photomultiplier tubes 36 are mounted in electrical additive relationship at the bank of circular detector 28.

The individual plastic phosphor logs 24 are secured in channel 38 by means of brackets 44 having resilient pads 42 and secured to channel 38 by means of a flat head screw 40 or the like. A removable stainless steel cover 46 is provided for the open end of the U-channel.

The mated, truncated end pieces 26 are secured in detector block mounting 102 in turn fixed to movable shield 50 by means of round head screws or the like 48 at the adjusting end of each plastic phosphor log. Similar round head screws 176 are used only at the fixed or non-adjusting end of each plastic phosphor log to secure the log to the channel. Compression springs 52 are positioned about rod spring guide 56 and compressed by means of spring pressurizing plate 54 secured at one end to Allenhead screw 60 extending through stationary pressure block 58. A plurality of binding head screws 64 are employed to secure splash guard 66 to stainless steel removable cover 46.

Plastic filler 68 may be employed at the end of photomultiplier tube 98 and fits about dynode chain 70. A plurality of high frequency fittings designated in the trade as BNC connectors 72 are employed to extend radially from preamp housing 80 adjacent preamp circuit board 78. A rubber pad 74 may be employed within cap end 76. Glue 82 may be employed to secure the photomultiplier tube base 84 to circuit board 78. A magnetic shield 86 is secured to the preamp housing 80 by means of vulcanized silicone rubber or like adhesive 88.

Aluminum spline 90 may be employed together with round head screws 92 to secure stationary pressure block 58 within the stainless steel U-channel 38. Photomultiplier tube springs 94 are positioned intermediate photomultiplier tube pressure ring 96 and shoulder 97 in magnetic shield 86.

Photomultiplier tube 98 is secured at its base in mounting block 102 by means of rubber ring 100. Template cushion 104 may be positioned intermediate truncated section 24 and mounting block 102. Aluminum fitting piece 106 may be employed intermediate mounting block 102 and U-shaped channel 38. Several circular ¼ inch diameter aluminum covered rubber pads 108 may be employed throughout the length of plastic phosphor log 24. Optical coupling 110 is defined at the abutting faces of log 24 and truncated section 26 made of plastic phosphor containing no fluor. As illustrated in FIG. 5, a plurality of flat head screws 112 are employed to secure shims 114 and room temperature vulcanized silicone rubber 116 is employed to secure the channel elements to each other.

Figure 3:
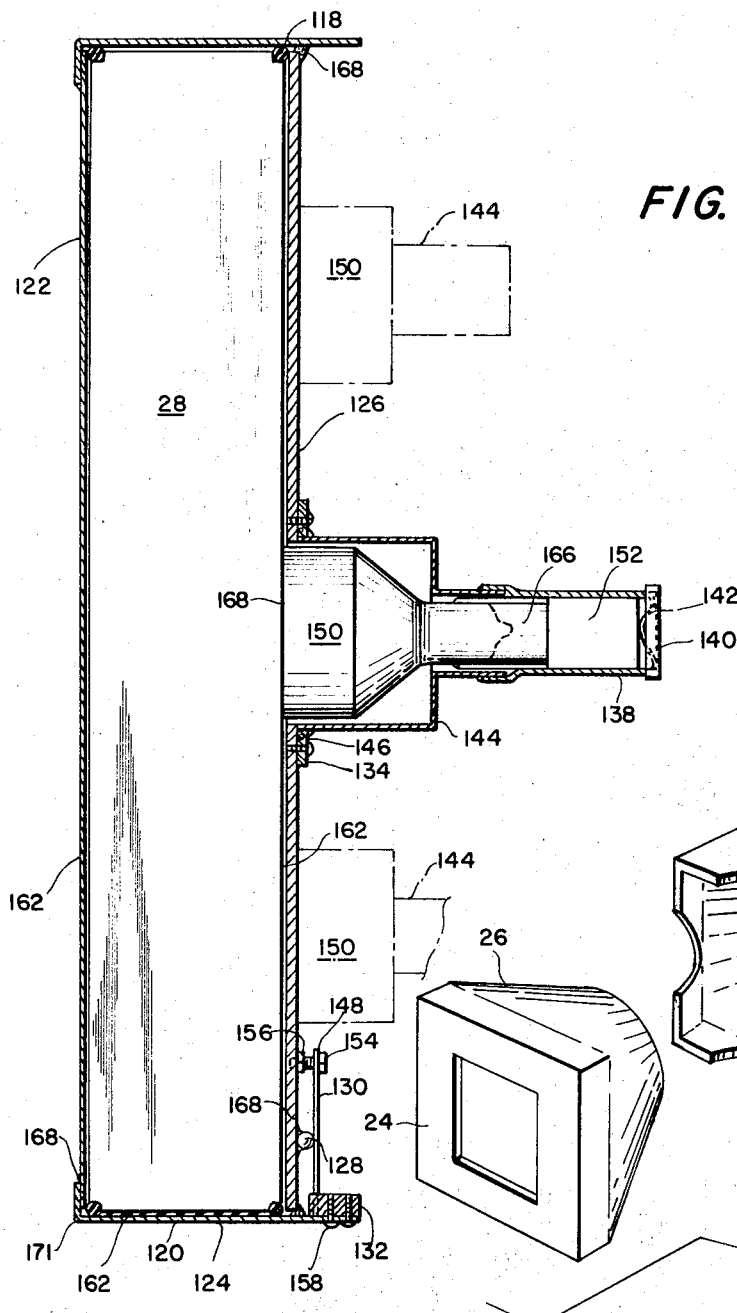
FIG. 3 is an enlarged elevation, partially in section, of the flat circular detector and a photomultiplier tube.

As illustrated in FIG. 3, circular flat detector 28 is supported against ¼ inch stainless steel face plate 126 by means of ¼ inch diameter rubber plate 118 at each corner and a $\frac{1}{16}$ inch thick rubber pad 120. Back cover 122 may be a .030 inch thick stainless steel plate. Top and bottom pieces 124 may be one inch thick stainless steel secured by means of weld 171. Face plate 126 is locked by means of lever arm 130 pivoted in on bolt 156 and secured thereto by means of hex headed cap screw 154. Lever arm 130 rests in block 132 and thereby pressing fulcrum bar 128 which is glued at 168 to the face plate surface.

Phenolic tube 136 encases photomultiplier tube 150 and in turn is secured by stainless photo tube ring 134, O-ring 146 being used to pressurize the photo tube shield 144 against face plate 126. Circuit board 152 may be mounted inwardly of tubing 138 and pressurized by means of bronze spring 142 which is secured in tubing cap 140.

As will be apparent various modifications in configuration of the detector elements as well as their supports, may be employed without departing from the spirit and scope of invention, as defined in the sub-joined claims.

We claim:
1. A scintillation detector comprising:
   (A) a plurality of polished plastic phosphor rectangular logs individually, removably supported in a horseshoe configuration, so as to inwardly define a detection zone; each log having: truncated conical sections of plastic phosphor containing no fluor and mounted at each end of said log;
   (B) a flat plastic phosphor detector mounted upon a wheeled carriage, said carriage being normally disposed with respect to said horseshoe configuration and at one end of said detection zone with photomultiplier tubes connected thereto in electrical additive relationship, said wheeled carriage being removable from said detection zone;
   (C) photomultiplier tubes mated to said truncated conical sections, said photomultiplier tubes being connected in electrical additive relationship, whereby a source of radioactive energy striking each said plastic phosphor log, produces a burst of light which travels along said log in both directions and is converted by said photomultiplier tubes to electrical energy;
   (D) an inert housing including inner resilient supports for each said plastic log and said photomultiplier tubes detachably mounted in a shielded detection zone; and
   (E) spring pressurizing means interconnecting said plastic phosphor logs and said photomultiplier tubes, so as to lock said photomultiplier tubes and said plastic phosphor logs to each other within said housing, said spring pressurizing means being positioned at an adjusting end of each said plastic phosphor log and including:
      (i) a stationary base plate encircling said photomultiplier tube and supported in said housing;
      (ii) a movable shield abutting an adjusting end of said truncated conical sections adjacent each log;
      (iii) a movable spring pressure plate supported in said housing intermediate said stationary base plate and said movable shield;
      (iv) spring pressurizing means supported intermediate said movable shield and said spring pressure plate; and
      (v) spring plate adjusting means extending through said stationary base plate and against said movable spring pressure plate, so as to move said spring plate and pressurize said spring means.

2. A scintillation detector as in claim 1, wherein the end of said plastic phosphor log opposite said adjusting end has its truncated conical section abutting a stationary shield without spring pressurizing means.

References Cited
UNITED STATES PATENTS

| | | | |
|---|---|---|---|
| 2,949,534 | 8/1960 | Youmans | 250—71.5 |
| 3,035,172 | 5/1962 | Cowan | 250—71.5 |
| 3,138,709 | 6/1964 | Cassen et al. | 250—71.5 |
| 3,237,765 | 3/1966 | Gaudin et al. | 250—71.5 |

OTHER REFERENCES

Regas, S., Low Level Gamma Counters and Their Uses in Biology and Medicine. Reprinted from Biomedical Sciences Instrumentation, vol. 1, Plenum Press, New York (1963), pp. 239–248.

ARCHIE R. BORCHELT, *Primary Examiner.*